United States Patent [19]

Slavens

[11] 4,244,822

[45] Jan. 13, 1981

[54] INDUSTRIAL TECHNIQUE MAGNETIC APPARATUS

[75] Inventor: John R. Slavens, Stow, Ohio

[73] Assignee: The Babcock & Wilcox Company, New Orleans, La.

[21] Appl. No.: 65,245

[22] Filed: Aug. 9, 1979

Related U.S. Application Data

[63] Continuation of Ser. No. 896,962, Apr. 17, 1978, abandoned.

[51] Int. Cl.³ ............................................. B01D 35/06
[52] U.S. Cl. .................................... 210/222; 210/277; 210/330; 210/340; 210/333.01
[58] Field of Search ............... 210/106, 108, 222, 264, 210/266, 275, 277, 283, 284, 290, 340, 341, 330, 333 R

[56] References Cited

U.S. PATENT DOCUMENTS

| 110,217 | 12/1870 | Dougherty | 210/340 |
| 189,364 | 4/1877 | Lonsburgh | 210/341 |
| 312,527 | 2/1885 | Spitznagel | 210/341 |
| 590,868 | 9/1897 | Wanner et al. | 210/277 |
| 1,165,124 | 12/1915 | Reisert | 210/277 |
| 3,567,026 | 3/1971 | Kolm | 210/222 |
| 3,757,954 | 9/1975 | Toth | 210/277 |
| 3,887,457 | 6/1975 | Marston | 210/222 |
| 3,979,288 | 9/1966 | Heltman | 210/222 |
| 4,033,864 | 7/1977 | Nolan | 210/222 |

Primary Examiner—Theodore A. Granger
Attorney, Agent, or Firm—D. Anthony Gregory; Robert J. Edwards

[57] ABSTRACT

An illustrative embodiment of the invention provides an electromagnetic filter for fluids in which two magnetizable beds are longitudinally separated. Each of these beds is provided with its own respective magnetizing coil. Incoming fluid is admitted to the space between the magnetizable beds. This flow is divided into two longitudinal oppositely directed streams in order to enable each stream to pass through its respective bed.

2 Claims, 1 Drawing Figure

U.S. Patent
Jan. 13, 1981
4,244,822
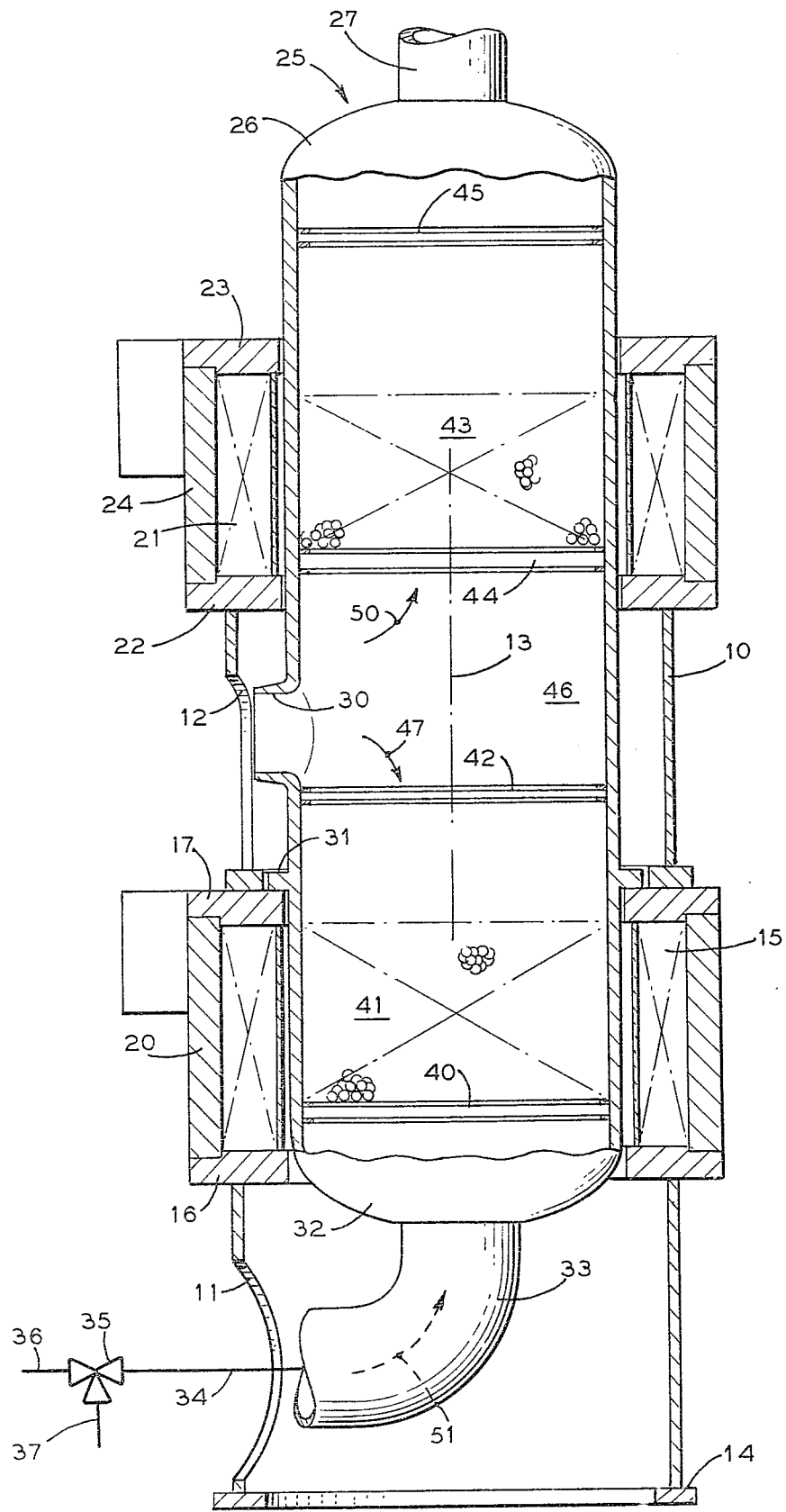

INDUSTRIAL TECHNIQUE MAGNETIC APPARATUS

This is a continuation of application Ser. No. 896,962 filed Apr. 17, 1978, now abandoned.

BACKGROUND OF THE INVENTION

1. Field of the Invention

This invention relates to fluid filters and, more particularly, to techniques for removing magnetizable material from fluids through electromagnetic techniques and the like.

2. Description of the Prior Art

Iron oxides and other substances that are attracted to magnets can be removed from fluids by means of this particular property. One illustrative method that relies on this particular phenomenon is described in more complete detail in H. G. Heitmann et al. U.S. Pat. No. 3,979,288 titled "Double-Flow Magnetic Filter, Apparatus and Method". In this Heitmann et al. patent a generally cylindrical vessel that contains a charge of magnetizable balls in the central portion of the vessel has a circumscribing electromagnet coil. Fluid that is to be filtered is admitted to the vessel through tubes that discharge into the central plane of the charge of balls by way of an array of open passages.

Upon energizing the electromagnet coil, a magnetic field is produced that magnetizes the balls. Magnetic impurities are attracted to these balls, thereby enabling purified water to flow from the vessel.

There are, however, a number of disadvantages that characterize this technique. Frequently, and particularly in connection with large commercial nuclear power plants, it is desirable to operate the electromagnet filter at one half capacity. This apparatus can not be operated in a one half capacity status, but must be operated at full capacity.

Naturally, devices of this nature also must be flushed from time-to-time. When flushing a filter that has been used to purify water in a nuclear power plant there is a further difficulty if the contaminants that are to be washed from the surfaces of the balls are radioactive. In this instance, for economy and for safety in radioactive waste material disposal, it is clearly desirable that the combined volume of flushing fluid and entrained or dissolved radioactive contaminants should be as small as possible. This need exists because the costs and difficulties associated with radioactive waste disposal are frequently related to the volume that must be processed. The volume of discharged flushing fluid from prior art filters nevertheless is rather large.

There also are a number of further disadvantages that have been observed in connection with devices of the foregoing character. Thus, for example, the pressure loss that is experienced in discharging the contaminated fluid that is to be filtered into the center of the bed of magnetizable balls is quite high. The balls that form the bed frequently block the passages into the filter bed thereby impeding the flow of liquid into the bed and producing a rather poor flow distribution within the filter bed.

This combination of single filter bed and circumscribing electromagnetic coil also imposes rather inflexible design limitations. Typically, the depth of the filter bed is not chosen to match the optimum flow length for the filtrate through the bed, but is determined in response to other, less desirable criteria. Typical among these undesirably dominant criteria is the maximum acceptable pressure loss in the filter bed and the practical considerations that essentially fix the electromagnetic coil length.

Cleansing the balls in the filter bed during flushing also is less than satisfactory because the flow distributor blocks a portion of the bed. Hence, the bed does not experience a beneficial longitudinal fluidization or "rising" movement. If the filter bed could be fluidized, however, it should provide a number of advantages during the flushing and cleansing operations. Fluidization, for instance, would cause the filter bed to expand and loosen debris that otherwise would be trapped in the bed. The balls also would become more fully exposed for improved washing in these circumstances, and also beat against one another to further shed contaminating matter.

The array of relatively small diameter tubes that establish flow into and out of the vessel also becomes subject to a number of other possible difficulties. Vibration and the fatigue and ultimate metal failure that often accompany fibration forces are illustrative in this respect of these difficulties that are likely to be aggravated in these prior art filters.

Accordingly, there is a genuine need for an electromagnetic filter that overcomes these serious industrial problems.

SUMMARY OF THE INVENTION

In accordance with the principles of the invention, these and other difficulties can, to a great extent, be overcome. More specifically, a typical filter characterizing the invention has two separate beds of magnetizable balls within a generally cylindrical vessel. The two filter beds are longitudinally separated by a distance that is at least equal to the diameter of the inlet fluid conduit. This conduit, moreover, discharges directly into the space between the two filter beds.

At least two separate electromagnet coils are positioned outside of the vessel, each coil being in general transverse alignment with a respective one of the filter beds. Two large filtrate discharge conduits secured to opposing longitudinal extremeties of the vessel establish fluid communication between the interior of the vessel and the balance of the piping circuit that is associated with the plant filter system.

This example of a physical configuration that characterizes the invention provides a number of advantages that at least alleviate if they do not entirely overcome, many of the problems that have beset the prior art. In this regard, the spacing between the two filter beds enables the incoming filtrate liquid to divide into essentially equal longitudinal and oppositely directed streams that flow through their respective beds with an essentially uniform distribution. This is accomplished without experiencing an inordinate pressure loss or flow irregularities that otherwise would result from magnetizable balls obstructing filtrate inlet passages, and the like.

Individual electromagnet coils for each of the filter beds also promote flexibility in operation. Thus, during those times in which it is desired to operate the filter at one half load, only one of the coils may be energized and the filtrate rerouted to flow all in a longitudinal direction through only a portion of the length of the entire vessel. In this way, only half of the electrical energy and filter capacity are required to operate the filter in the half load condition.

A further and more direct benefit that the individual electromagnetic coils provide is the opportunity to match the depths of the filter beds to a desired optimum value. As noted above, filter efficiency is to a great extent related to optimum flow length and filter bed depth. In double flow single filter bed designs of the type that characterizes the prior art, however, the depth of the filter bed is determined in response to other considerations. These considerations ultimately compel the use of a flow length through the bed and a depth of filter bed that is not as efficient as it could have been, if bed depth and flow length were permitted to dominate the design choices. Through the use of separate electromagnetic coils and separate associated filter beds, however, the depths of the beds and the flow lengths through these beds can be selected to provide the desired efficiency for each filter bed while the entire filter unit satisfies the other conditions that otherwise would have produced a much less efficient device.

Flushing the filter to remove contaminants also is improved through the application of the invention. For instance, for flushing purposes, half the usual filter capacity fluid volume can be introduced into the vessel. The flushing fluid, thereby dissolves or entrains contaminants in only half of the volume of liquid that is required to flush prior art devices of similar capacity because the flushing fluid from one bed also flushes the other bed. This is, of course, a distinct advantage in concentrating and reducing the volume of waste material that must be processed and is particularly valuable in handling radioactive contaminants in which the cost and difficulty of storage are in many respects related to the fluid volume that must be processed.

In accordance with a further advantage of the invention, it is noted that during flushing operations, the flushing fluid enters one of the filtrate discharge outlets and flows through both of the filter beds in the same direction. If preferred, the longitudinal axis of filter vessel can be positioned vertically and the flushing fluid admitted through the lowermost filtrate discharge nozzle. Thus, the upwardly flowing flushing fluid balances the oppositely directed gravitational forces thereby fluidizing the filter beds and allowing these beds to rise and expand. As previously mentioned, treating the filter beds in this manner significantly improves the cleansing capabilities of the flushing action.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The sole FIGURE of the drawing shows a typical structure embodying principles of the invention in full section.

DETAILED DESCRIPTION OF THE PREFERRED EMBODIMENTS

For a more complete appreciation of the invention, attention is invited to the drawing. An electromagnetic filter that characterizes the invention has a generally cylindrical support shroud 10. Two generally circular apertures 11, 12 pierce the shroud 10. A longitudinal axis 13 is defined by the shroud 10. As shown, the shroud 10 is mounted with the axis 13 in the vertical direction, transverse end 14 of the shroud providing a base for supporting essentially the entire structure.

An electromagnetic coil 15 is secured to the shroud 10 a short vertical distance above the aperture 11. The coil 15 is concentric with the longitudinal axis 13 and has suitable electrical connections (not shown in the drawing). A pair of longitudinally spaced annular members 16, 17 receive the coil 15. A hollow cylindrical member 20 completes the external covering surfaces of the coil 15.

The support shroud 10 is further interposed between the coil 15 and a similar, vertically spaced electromagnetic coil 21. The coil 21 also is concentric with the longitudinal axis 13 and is provided with suitable electrically energizing connections (also not shown in the drawing). Vertically separated annular members 22, 23 and a longitudinally disposed hollow cylindrical member 24 complete the shroud and the housing for the external surfaces of the coil 21.

A generally cylindrical vessel 25 is mounted within the shroud 10. The longitudinal axis of the vessel 25 is coincident with the support shroud axis 13. As shown, a dome 26 closes the uppermost transverse end of the vessel 25. The dome 26 also has an axially aligned and vertically oriented filtrate discharge conduit 27.

Approximately in the longitudinal midplane of the vessel 12 and in general alignment with the aperture 12 in the shroud 10, a filtrate inlet conduit 30 establishes fluid communication with the interior of the vessel. A radially oriented support flange 31 protrudes outwardly in a transverse direction from the vessel 25. The flange 31 is located vertically below the filtrate inlet conduit 30. As shown, the flange 31 bears upon the upper surface of the annular member 17, thereby transferring much of the load of the vessel 25 to the support shroud 10 and the transverse end 14 of the shroud.

A further dome 32 seals the transverse end of the vessel 25 that is adjacent to the shroud end 14. A filtrate discharge conduit 33 establishes fluid communication, moreover, between the interior of the vessel 25 and the balance of the filtrate system piping 34 through the aperture 11 with which the terminal end of the discharge conduit 33 is aligned. A three-way valve 35 selectively establishes fluid communication for the discharged filtrate through to a conduit 36 or provides access means for a flushing fluid for the interior of the vessel 25 by way of a conduit 37.

Within the vessel 25 a transversely disposed support screen 40 is secured to the inner wall of the vessel a short vertical distance above the dome 32. The support screen sustains a packed bed of magnetizable material or balls 41. These magnetizable balls occupy a volume within the vessel 25 that is generally bounded by the transverse planes of the annular members 16, 17 in order to provide a filter bed. The vertical length of the filter bed is matched to the mean free path of the filtrate through the bed in order to provide the most efficient possible filtering.

In accordance with a feature of the invention, a restraining screen 42 is spaced vertically above the filter bed formed by the balls 41. The restraining screen 42, moreover, is secured to the inner wall of the vessel 25 immediately below the filtrate inlet conduit 30.

Another filter bed 43, formed of magnetizable balls, or the like is sustained between the transverse planes established by means of the annular members 22, 23 vertically above the filtrate inlet conduit. A support screen 44 that is secured to the inner surface of the vessel 25 supports the filter bed 43 in its vertically elevated position. As illustrated, the vertical length of the filter bed 43 also is matched to the optimum filtrate mean free path that will provide the most efficient possible filtering. A further restraining screen 45 is spaced vertically above the filter bed 43, in a transverse plane that is immediately below the dome 26.

In operation, the electromagnetic coils 15, 21 are electrically energized in order to produce two magnetic fields within the vessel 25. These magnetic fields each magnetize the balls that form the filter beds 41, 43 that are associated with the respective coils 15, 21.

Filtrate is admitted to the vessel 25 through the inlet conduit 30 in order to enter a plenum 46. Within the plenum 46, the filtrate divides into two vertically directed streams as indicated by means of arrows 47, 50. Thus, as illustrated, one of the streams passes in a vertically downward direction, as indicated by means of the arrow 47, through the filter bed 41. Within the filter bed 41, the magnetized balls attract magnetic materials from the stream, thereby removing from the fluid that discharges from the filter bed 41 essentially all magneitc impurities. The purified filtrate stream then flows through the discharge conduit 33 to the balance of the plant through the filtrate system piping 34, the three-way-valve 35 and the conduit 36.

Naturally, the magnetic impurities adhere to the balls in the filter bed 41 through magnetic attraction effects. The pressure loss within the filter bed 41, moreover, is significantly reduced and flow distribution through the filter bed is improved because a more uniform and unimpeded flow is provided as the fluid enters the bed through the plenum 46. The mean free flow path for the filtrate through the filter bed 41 also is matched to provide maximum system efficiency in removing filtrate impurities.

In a similar manner, the stream of filtrate that flows in the direction of the arrow 50 is purified of magnetic impurities in the filter bed 43. This filtrate stream flows out of the vessel 25 through the discharge conduit 27.

It will be recalled that it is desirable at times to operate a magnetic filter at one half capacity. In this circumstance, one of the two coils 15, 21 is electrically energized and filtrate is admitted to the vessel 25 through the conduit 30. This stream of filtrate passes through the vessel 25 in a vertical direction, leaving magnetic contaminants on the surfaces of the balls in the filter bed that has been magnetized. This half-load filtrate leaves the vessel 25 through the conduit 27.

It is of course, also possible to operate the system at half load, admitting the filtrate to the vessel 25 through the conduit 30 to permit the stream to flow in a vertically downward direction. In this latter instance the half-load flow will leave the vessel 25 by way of the discharge conduit 33.

The balls or other magnetization material that form the filter beds 41, 43 collect a surface film of magnetic substances through removal of these substances from the filtrate. This matter is, in accordance with another feature of the invention, flushed out of the system in a very high concentration and small volume of fluid relative to prior art magnetic filters of comparable capacity. Illustratively, a valve (not shown in the drawing) is shut to prevent flushing fluid from flowing out of the vessel 25 through the inlet conduit 30. The electromagnetic coil 15, 21 are deenergized to eliminate temporarily the magnetic fields in the filter beds 41, 43. Through proper material selection, i.e., choosing soft iron, or the like, or through appropriate deganssing or demagnetization the balls that form these filter beds loose almost all of the magnetism, thereby freeing from the surfaces of the balls the matter that had been adhering magnetically to those surfaces.

The three-way valve 35 is manipulated to establish flushing fluid communication with the interior of the vessel 25 through a path that includes the conduit 37, the valve 35, the filtrate system piping 34 and the discharge conduit 33. The flushing fluid flows in a vertically upward direction within the vessel 25, generally following the direction of the arrow 51. In accordance with the invention, the force of the upwardly flowing stream of flushing fluid is applied to the balls in the beds 41, 43 in a direction that is opposite to the gravitational force direction. These oppositely directed forces tend to "fluidize" the filter beds, causing the individual balls to separate and bounce against one another. The screens 42, 45, however, prevent the balls in the respective filter beds 41, 43 from breaking loose from the interior of the vessel 25.

This increase in the volumes of the filter beds 41, 43 exposes more of the surfaces of the balls to the cleansing action of the flushing fluid. The mutual agitation of the balls also tends to break or scour those contaminants from the surfaces of the balls, thereby enhancing the cleansing action of the flushing fluid.

To restore the filter to operation, the valve 35 is manipulated to establish fluid communication through the conduit 36 from the interior of the vessel 25 by way of the filtrate discharge conduit 33. The valve (not shown in the drawing) that controls flow through the inlet conduit 30 is opened to reestablish flow through that conduit to the interior of the vessel 25. Finally, the electromagnetic coils 15, 21 are energized to provide magnetization for the filter beds 41, 43.

Thus, during half load operation and during flushing, the filter functions in the desired mode of operation with one half of the volume of fluid that otherwise would be required, inasmuch as the filtrate inlet conduit 30 may handle approximately twice the volume of fluid as either of the discharge conduits 27, 33.

Consequently, the invention provides a substantially improved magnetic filter that is characterized by increased efficiency, flexibility for half load operation and superior operation for flushing purposes.

The embodiments of the invention in which an exclusive property or privilege is claimed are defined as follows:

1. A dual magnetic filter comprising:
   a vessel;
   an upper magnetizable fluidizable filter assembly disposed within said vessel;
   a lower magnetizable fluidizable filter assembly disposed within said vessel;
   said upper filter assembly being spaced above said lower filter assembly to provide a plenum therebetween;
   a filtrate inlet conduit penetrating said vessel to establish fluid communication therebetween at said plenum;
   an inlet conduit valve for selectively shutting said inlet conduit;
   an upper filtrate discharge conduit penetrating said vessel to establish fluid communication therebetween above said upper filter assembly;

a lower filtrate discharge conduit penetrating said vessel to establish fluid communication therebetween below said lower filter assembly;

magnetizing means for individually selectively magnetizing said upper assembly and said lower assembly;

a threeway valve for selectively shutting said lower discharge conduit and for admitting wash fluid into said vessel through said lower discharge conduit;

said upper filter assembly including an upper bed of magnetizable pellets, an upper support screen extending across the interior of said vessel below said upper bed to support said upper bed, said upper support screen being apertured to preclude the passage of the pellets of said upper bed therethrough and to allow the passage of filtrate therethrough, an upper restraining screen extending across the interior of said vessel above said upper bed, said upper restraining screen being apertured to preclude the passage of the pellets of said upper bed therethrough and to allow the passage of filtrate therethrough, said upper restraining screen being spaced a sufficient distance above said upper bed to allow said upper bed to fluidize when a sufficient flow rate of wash fluid is provided up therethrough; and, said lower filter assembly including a lower bed of magnetizable pellets, a lower support screen extending across the interior of said vessel below said lower bed to support said lower bed, said lower support screen being apertured to preclude the passage of the pellets of said lower bed therethrough and to allow the passage of filtrate therethrough, a lower restraining screen extending across the interior of said vessel above said lower bed, said lower restraining screen being apertured to preclude the passage of the pellets of said lower bed therethrough and to allow the passage of filtrate therethrough, said lower restraining screen being spaced a sufficient distance above said lower bed to allow said lower bed to fluidize when a sufficient flow rate of wash fluid is provided up therethrough.

2. A dual magnetic filter comprising:

a vessel;

an upper magnetizable fluidizable filter assembly disposed within said vessel;

a lower magnetizable fluidizable filter assembly disposed within said vessel;

said upper filter assembly being spaced above said lower filter assembly to provide a plenum therebetween;

a filtrate inlet conduit penetrating said vessel to establish fluid communication therebetween at said plenum;

an inlet conduit valve for selectively shutting said inlet conduit;

an upper filtrate discharge conduit penetrating said vessel to establish fluid communication therebetween above said upper filter assembly;

a lower filtrate discharge conduit penetrating said vessel to establish fluid communication therebetween below said lower filter assembly;

magnetizing means for individually selectively magnetizing said upper assembly and said lower assembly;

a threeway valve for selectively shutting said lower discharge conduit and for admitting wash fluid into said vessel through said lower discharge conduit;

said magnetizing means including an upper electromagnetic coil circumscribing a portion of the outer surface of said vessel in the vicinity of said upper assembly capable of magnetizing said upper bed of magnetizable pellets, a lower electromagnetic coil circumscribing a portion of the outer surface of said vessel in the vicinity of said lower assembly capable of magnetizing said lower bed of magnetizable pellets; and, said pellets are spherical.

* * * * *